(No Model.) 3 Sheets—Sheet 2.
J. R. ROWLAND.
REMOVABLE COVER FOR TANKS.
No. 506,016. Patented Oct. 3, 1893.
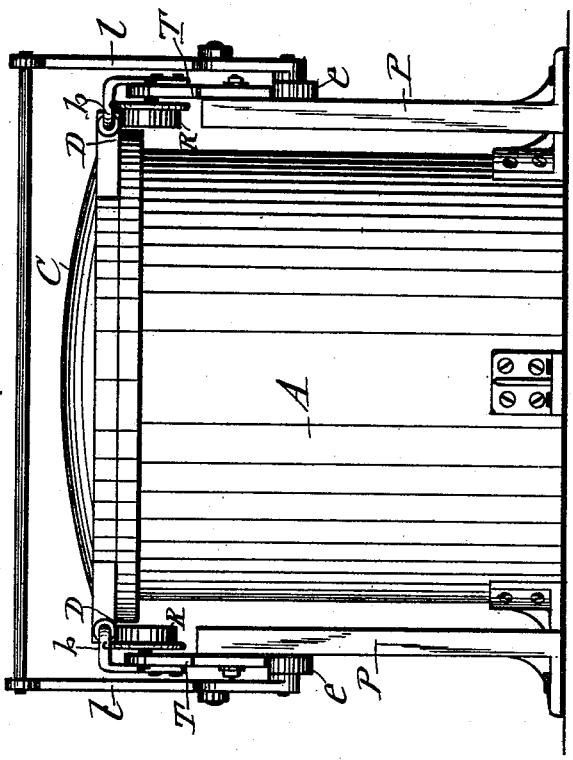
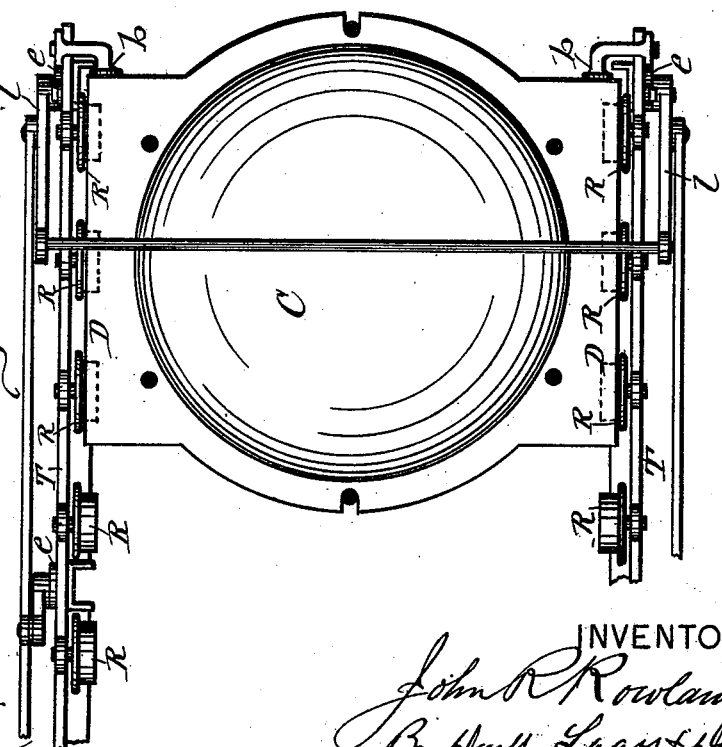
WITNESSES:
C. L. Bendixon
J. J. Laass
INVENTOR:
John R Rowland
By Hull, Laass & Hull
his ATTORNEYS.

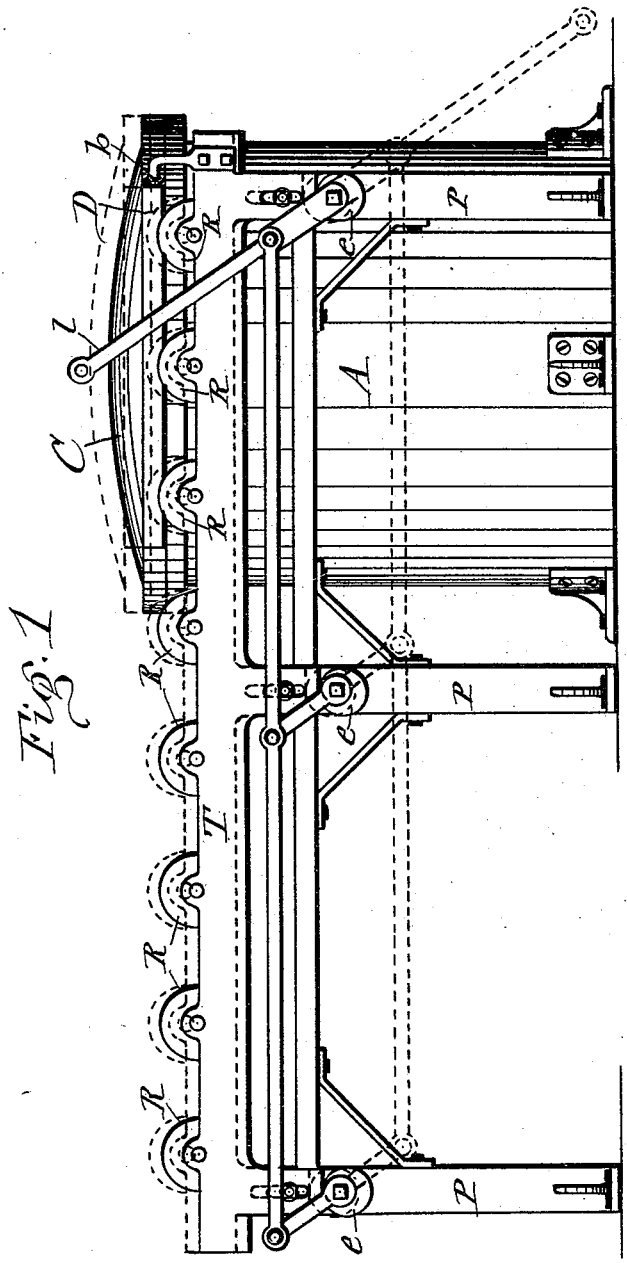

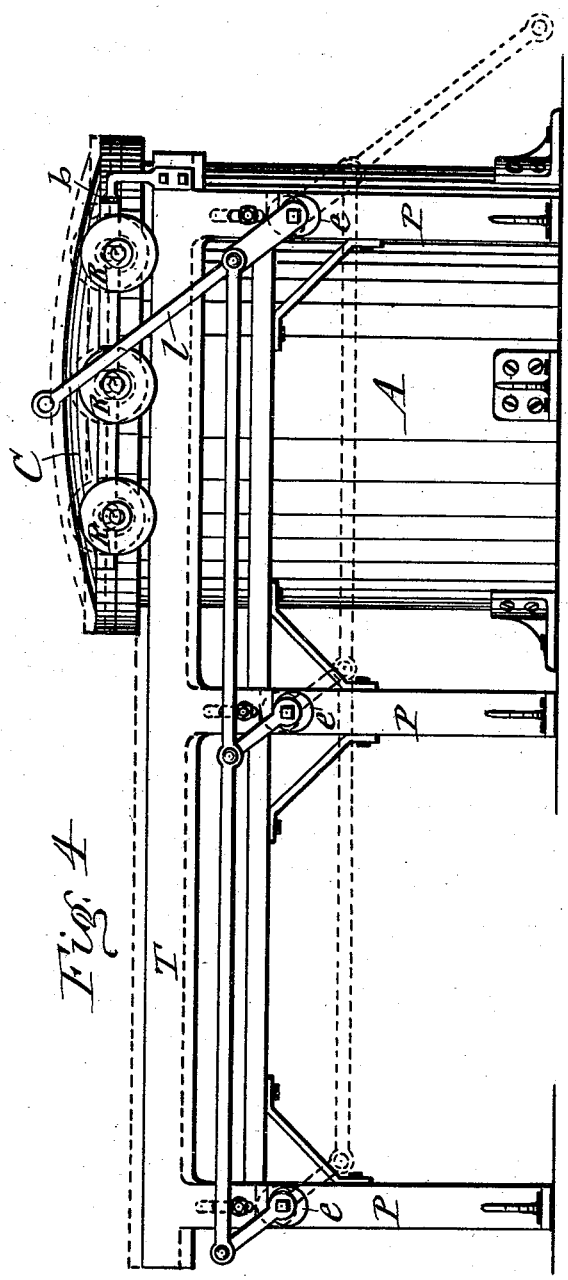

UNITED STATES PATENT OFFICE.

JOHN R. ROWLAND, OF SYRACUSE, NEW YORK, ASSIGNOR TO THE HEMINGWAY MANUFACTURING COMPANY, OF SAME PLACE.

REMOVABLE COVER FOR TANKS.

SPECIFICATION forming part of Letters Patent No. 506,016, dated October 3, 1893.

Application filed December 7, 1892. Serial No. 454,335. (No model.)

*To all whom it may concern:*

Be it known that I, JOHN R. ROWLAND, of Syracuse, in the county of Onondaga, in the State of New York, have invented new and useful Improvements in Removable Covers for Tanks, of which the following, taken in connection with the accompanying drawings, is a full, clear, and exact description.

This invention relates to means for removing and replacing heavy covers to large cooking tanks and analogous apparatus. And the object of the invention is to accomplish the aforesaid in an expeditious and convenient manner. And to that end the invention consists essentially in the combination with the tank and its removable cover, of vertically movable tracks disposed parallel to each other at opposite sides of the tank and nearly or quite horizontal, rollers running on said tracks and supporting the cover, and levers raising and lowering the tracks as hereinafter more fully described and specifically set forth in the claims.

In the annexed drawings Figure 1 is a side elevation of a cover-shifting apparatus embodying my invention. Fig. 2 is a plan view of the same. Fig. 3 is an end elevation, and Fig. 4 is a side elevation of a modification of my invention.

Similar letters of reference indicate corresponding parts.

A— represents the tank and C— the removable cover thereof. To conveniently and expeditiously remove and replace the said cover from and to the tank I mount the cover on rollers running on tracks all of which are movable vertically so as to allow the cover to be lifted from and lowered onto the tank.

D—D— represent the tracks and —R—R— the rollers upon which latter the cover —C— is run to and from the tank. Said tracks are arranged parallel to each other at opposite sides of the tank and nearly or quite horizontal, and may be either affixed to the cover and riding on the rollers pivoted to vertically movable stringers —T—T— as shown in Figs. 1, 2 and 3 of the drawings, or the said rollers may be pivoted to the cover and the aforesaid stringers may be employed for the tracks upon which said rollers run, as represented in Fig. 4 of the drawings. In either case the tracks and rollers are adapted to be elevated to lift the cover —C— from the tank and allow it to be run from the same, and then back and lowered onto the tank. For raising and lowering the tracks and rollers as aforesaid I employ suitable levers —*l*—*l*— properly fulcrumed for the purpose. I preferably connect said levers to one set of a series of eccentrics —*e*—*e*— pivoted to the posts —P—P— which support the stringers or tracks —T—T— movable up and down. The eccentrics are all coupled together to move in unison and simultaneously engage the bottoms of the stringers or tracks and by turning said eccentrics by means of the aforesaid lever the stringers or tracks are raised or lowered and the cover —C— is lifted or lowered correspondingly. This allows the cover to be lifted from the tank and run off to one side thereof when desired to open the tank. By leaving the cover in its elevated position it can be readily run back to its requisite position over the tank where it is arrested by stops, *b*, and then by operating the levers —*l*—, the stringers or tracks can be lowered to allow the cover to descend and become seated upon the tank and secured thereto in the usual manner.

Having described my invention, what I claim as new, and desire to secure by Letters Patent, is—

1. The combination with the tank and its removable cover, of parallel stringers or tracks at opposite sides of the tank and movable vertically on their supports, rollers interposed between the cover and tracks to carry the cover, and levers raising and lowering the tracks and rollers as set forth.

2. In combination with the tank and its removable cover, vertically movable tracks, eccentrics adapted to raise and lower said tracks, levers operating said eccentrics, and rollers running on the tracks and carrying the cover, as set forth.

In testimony whereof I have hereunto signed my name this 3d day of November, 1892.

JOHN R. ROWLAND. [L. S.]

Witnesses:
H. M. SEAMANS,
C. L. BENDIXON.